United States Patent
Hopkins, III

(10) Patent No.: US 8,566,126 B1
(45) Date of Patent: Oct. 22, 2013

(54) SYSTEMS AND METHODS FOR PROCESSING VEHICLE OR DRIVER PERFORMANCE DATA

(75) Inventor: John Chandler Hopkins, III, San Antonio, TX (US)

(73) Assignee: United Services Automobile Association, San Antonio, TX (US)

( * ) Notice: Subject to any disclaimer, the term of this patent is extended or adjusted under 35 U.S.C. 154(b) by 1107 days.

(21) Appl. No.: 11/860,295

(22) Filed: Sep. 24, 2007

(51) Int. Cl.
| G06Q 40/00 | (2012.01) |
| B60Q 1/00 | (2006.01) |
| G08C 19/16 | (2006.01) |
| G11B 5/00 | (2006.01) |
| G06F 17/40 | (2006.01) |
| B60R 21/0132 | (2006.01) |

(52) U.S. Cl.
CPC ............. *G06F 17/40* (2013.01); *B60R 21/0132* (2013.01)
USPC ............... 705/4; 340/439; 340/870.01; 360/5

(58) Field of Classification Search
CPC ........................... G06F 17/40; B60R 21/0132
USPC ....................... 705/4; 340/439, 870.01; 360/5
See application file for complete search history.

(56) References Cited

U.S. PATENT DOCUMENTS

| 6,064,970 A * | 5/2000 | McMillan et al. ................ 705/4 |
| 7,339,483 B1 | 3/2008 | Farmer |
| 7,937,278 B1 | 5/2011 | Cripe et al. |
| 8,180,655 B1 | 5/2012 | Hopkins, III |
| 2002/0111725 A1 * | 8/2002 | Burge ............................. 701/29 |
| 2007/0151133 A1 | 7/2007 | Hunsaker |
| 2008/0255722 A1 | 10/2008 | McClellan et al. |
| 2009/0024419 A1 | 1/2009 | McClellan et al. |

OTHER PUBLICATIONS

Insurance4USA.com, "What factors does a company consider when calculating car insurance rates," pp. 1-2, Copyright 2000-2007 Insurance4USA.com, Denver, CO.

Todd Litman, "Distance-Based Vehicle Insurance—A Practical Strategy for More Optimal Pricing," Victoria Transport Policy Institute, Sep. 7, 2007, pp. 1-20, Copyright 1998 Todd Alexander Lltman, Victoria, BC, Canada.

Tom Wenzel, "Analysis of National Pay-As-You-Drive Insurance Systems and Other Variable Driving Charges," Lawrence Berkeley National Laboratory—University of California, Energy & Environment Division, Jul. 1995, pp. 1-74, Berkeley, CA 94720.

Todd Litman, "Distance-Based Charges; A Practical Strategy for More Optimal Vehicle Pricing," Victoria Transport Policy Institute, Originally presented at: Transportation Research Board 78th Annual Meeting, Jan. 1999, Session 458, Paper No. 99-0678, pp. 1-11, Copyright 1998 Todd Alexander Lltman, Victoria, BC, Canada.

(Continued)

*Primary Examiner* — Ella Colbert
*Assistant Examiner* — Scott S Trotter
(74) *Attorney, Agent, or Firm* — Schwegman Lundberg & Woessner P.A.

(57) ABSTRACT

Apparatus and methods to process vehicle or driver behavior data are described herein. In some examples, the behavior data is used by a premium calculating engine to derive a premium for a vehicle insurance policy using the data. The behavior data may be associated with a single driver, or may be associated with all drivers of a vehicle without regard to the actual drivers, in some examples. Data received from the vehicle may also include vehicle performance data, in further examples. Additionally, a method of underwriting a dynamic vehicle insurance policy is described, in one example.

21 Claims, 6 Drawing Sheets

(56) References Cited

OTHER PUBLICATIONS

Aaron S. Edlin, "Per-Mile Premiums for Auto Insurance," Department of Economics—UC Berkeley and NBER, Jan. 27, 1999, Berkeley, CA 94720.
From Wikipedia, "Auto-insurance Risk Selection," Wikipedia, the free encyclopedia, (http://en.wikipedia.org/wiki/Auto_insurance_risk_selection), pp. 1-4, Sep. 2, 2007.
"U.S. Appl. No. 11/860,306, Non Final Office Action mailed Sep. 1, 2009", 9 pgs.
"U.S. Appl. No. 11/860,319, Advisory Action mailed Apr. 5, 2010", 3 pgs.
"U.S. Appl. No. 11/860,319, Appeal Brief filed Jun. 18, 2010", 21 pgs.
"U.S. Appl. No. 11/860,319, Decision on Pre-Appeal Brief Request mailed May 14, 2010", 2 pgs.
"U.S. Appl. No. 11/860,319, Examiner Interview Summary mailed Sep. 11, 2009", 4 pgs.
"U.S. Appl. No. 11/860,319, Examiner Interview Summary mailed Oct. 14, 2010", 4 pgs.
"U.S. Appl. No. 11/860,319, Final Office Action mailed Jan. 11, 2010", 10 pgs.
"U.S. Appl. No. 11/860,319, Final Office Action mailed Dec. 21, 2010", 13 pgs.
"U.S. Appl. No. 11/860,319, Non Final Office Action mailed May 13, 2009", 11 pgs.
"U.S. Appl. No. 11/860,319, Non Final Office Action mailed Jul. 22, 2011", 12 pgs.
"U.S. Appl. No. 11/860,319, Non-Final Office Action mailed Jul. 2, 2010", 13 pgs.
"U.S. Appl. No. 11/860,319, Notice of Allowance mailed Jan. 10, 2012", 10 pgs.
"U.S. Appl. No. 11/860,319, Pre-Appeal Brief Request filed Apr. 12, 2010", 4 pgs.
"U.S. Appl. No. 11/860,319, Response filed Mar. 11, 2010 to Final Office Action mailed Jan. 11, 2010", 11 pgs.
"U.S. Appl. No. 11/860,319, Response filed Apr. 21, 2011 to Final Office Action mailed Dec. 21, 2010", 11 pgs.
"U.S. Appl. No. 11/860,319, Response filed Sep. 11, 2009 to Non Final Office Action mailed May 13, 2009", 14 pgs.
"U.S. Appl. No. 11/860,319, Response filed Oct. 4, 2010 to Non Final Office Action mailed Jul. 2, 2010", 11 pgs.
"U.S. Appl. No. 11/860,319, Response filed Oct. 24, 2011 to Non Final Office Action mailed Jul. 22, 2011", 11 pgs.
"U.S. Appl. No. 11/860,331, Non Final Office Action mailed May 18, 2009", 8 pgs.
Wyman, Oliver, et al., "The case for optimizing your insurance", (2007), 12 pgs.

* cited by examiner

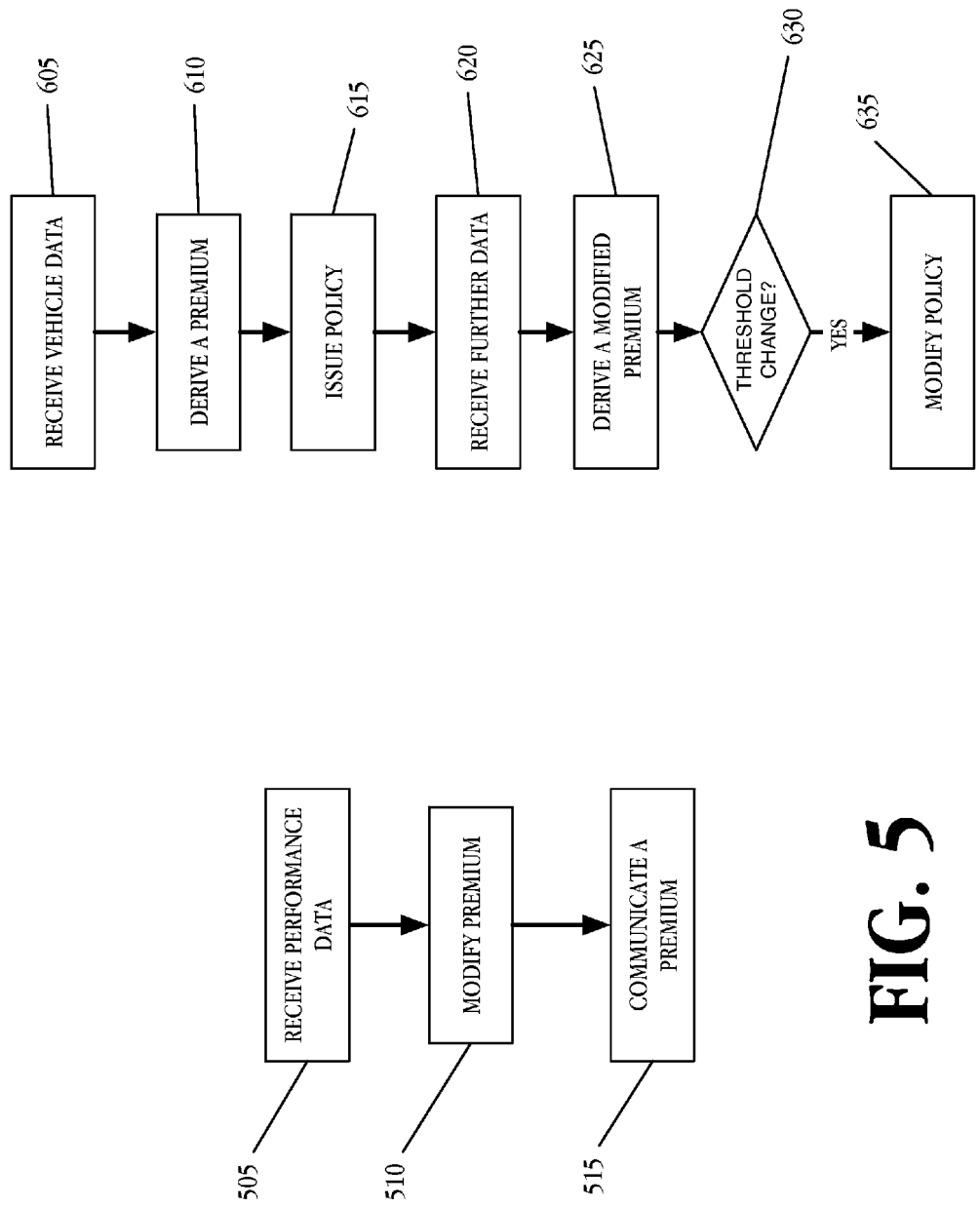

SYSTEMS AND METHODS FOR PROCESSING VEHICLE OR DRIVER PERFORMANCE DATA

RELATED APPLICATIONS

This disclosure is related to pending U.S. patent application Ser. No. 11/860,306, titled "SYSTEMS AND METHODS FOR PROCESSING VEHICLE OR DRIVER PERFORMANCE DATA," U.S. patent application Ser. No. 11/860,319, titled "SYSTEMS AND METHODS FOR PROCESSING VEHICLE OR DRIVER PERFORMANCE DATA," U.S. patent application Ser. No. 11/860,331, titled "SYSTEMS AND METHODS FOR PROCESSING VEHICLE OR DRIVER PERFORMANCE DATA," filed on an even date herewith.

TECHNICAL FIELD

This application relates to systems and methods that process behavior data and more particularly to systems and methods that process vehicle or behavior data.

BACKGROUND

Customers demand more of the products and services they use than ever before. They insist that the companies they deal with on a regular basis provide them greater and greater levels of service and competitive pricing. More competitive pricing requires greater levels of information. Products can be priced more exactly when all the components that affect pricing are taken into account. For instance, in the insurance industry, information about an individual is used to properly quote insurance policies. Two 35 year old single males may appear, based on age and gender, to be similar. However, each of those individuals may have different jobs, different family medical histories, and different hobbies. By using all the information that may be obtained, the policy for the less risky of the two can be priced lower than the higher risk. By performing operations on exact data, or more robust data, risk to the company can be properly managed.

SUMMARY

In an embodiment, a method of processing data received from a vehicle includes receiving behavior data, calculating at least one insurance risk using the behavior data, determining a premium for a vehicle insurance policy, and issuing the vehicle insurance policy. In a further embodiment, the behavior data is associated with a single driver and the vehicle insurance policy.

In an embodiment, a method of dynamically modifying an existing vehicle insurance policy includes receiving vehicle performance data from an insured vehicle, modifying a premium for a policy covering the insured vehicle and communicating the modified premium. The vehicle performance data may include, without limitation, mileage, location and routes. By comparing the vehicle performance data, in one example, with stored data, a change in behavior may be identified, and the premium for the policy may be modified.

In an embodiment, a method of issuing and maintaining a dynamic vehicle insurance policy includes receiving data from a vehicle, deriving a premium and issuing a vehicle insurance policy, receiving further data, deriving a modified premium using the further data, determining if a threshold change has been exceeded and modifying the vehicle insurance policy using the modified premium if a threshold change has been exceeded.

In an embodiment, an apparatus for processing vehicle data includes a data monitoring module to retrieve data from a data processing module operated within a vehicle, and a premium calculating engine to derive a premium for a vehicle insurance policy using the data. The apparatus may additionally include a risk calculating engine to derive a risk associated with the vehicle insurance policy using the data. In a further embodiment, the apparatus additionally includes an underwriting engine to receive a request for insurance and to issue the vehicle insurance policy.

BRIEF DESCRIPTION OF THE DRAWINGS

Embodiments are illustrated by way of example and not limitation in the figures of the accompanying drawings, in which like references indicate similar elements and in which:

FIG. 5 shows a flowchart of a method for modifying an insurance premium, in accordance with an example embodiment;

FIG. 6 shows a flowchart of a method for dynamically modifying a vehicle insurance premium, in accordance with an example embodiment.

DETAILED DESCRIPTION

In the following detailed description of example embodiments, reference is made to the accompanying drawings, which form a part hereof and in which is shown, by way of illustration, specific embodiments in which the example method, apparatus, and system may be practiced. It is to be understood that other embodiments may be utilized and structural changes may be made without departing from the scope of this description.

Figure 1:
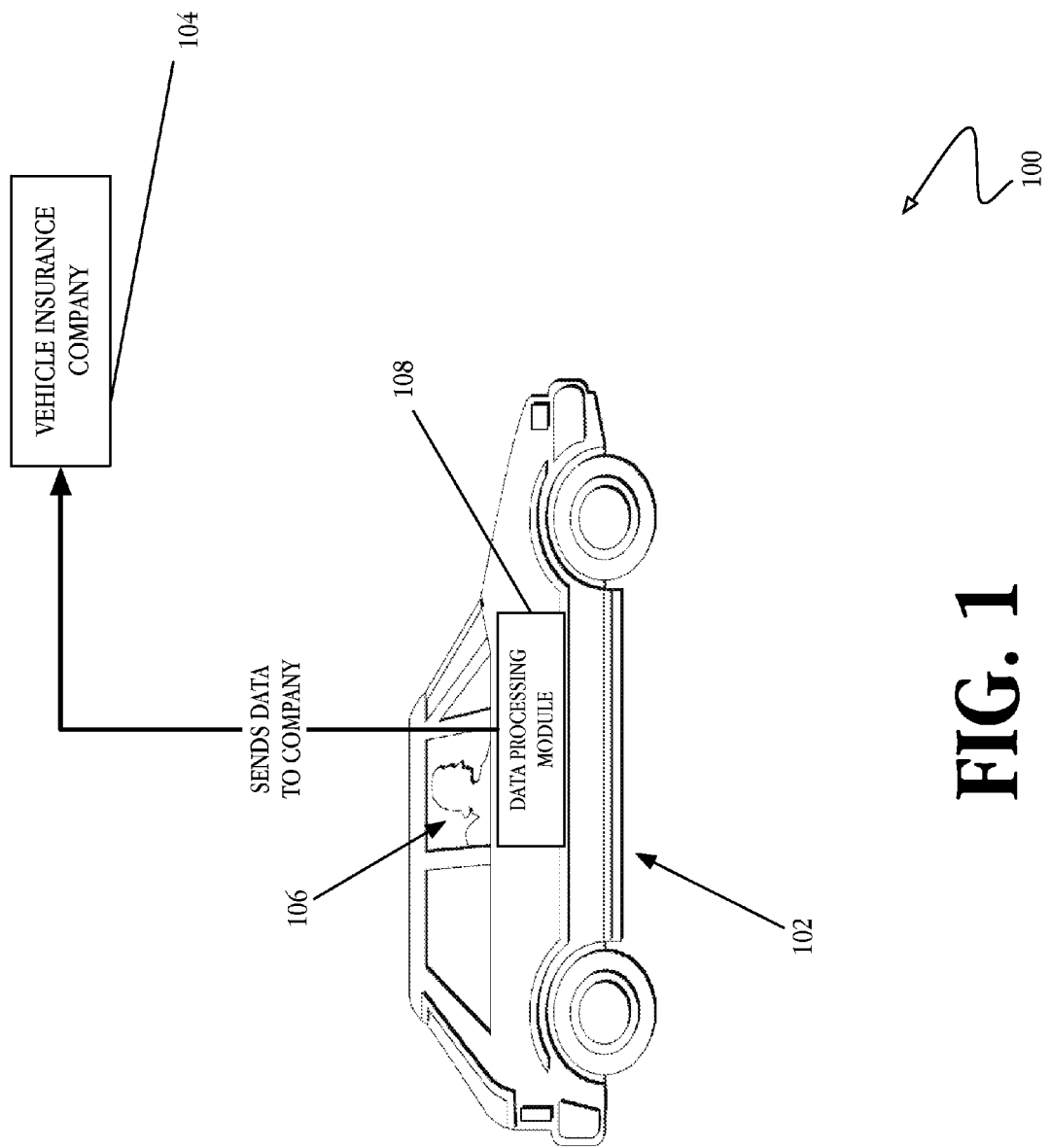
FIG. 1 shows a high-level block diagram of a vehicle insurance system, in accordance with an example embodiment.

FIG. 1 shows a high-level block diagram of a vehicle insurance system, in accordance with an example embodiment. The system 100 includes a vehicle 102 and a vehicle insurance company 104. The owner 106 of the vehicle 102 enters into an agreement with the vehicle insurance company 104, in which the vehicle insurance company 104 insures the vehicle 102 for damage or loss and the owner 106 agrees to pay periodic premiums. The vehicle insurance company 104 sets the premium based on the risk of the owner 106 and the vehicle.

In an embodiment, the vehicle 102 includes a data processing module 108. The data processing module 108 is provided by the vehicle insurance company 104 and is configured to acquire vehicle performance data, in one example. In a further example, the data processing module 108 is additionally configured to calculate behavior data using the vehicle performance data. The behavior data is a measure of the driving behavior of the drivers of the vehicle 102. Systems operating at the vehicle insurance company 104 receive the behavior data, the vehicle performance data, or some combination and derive an insurance risk using that data. Alternately, the systems may derive an insurance premium. This risk information is a measure of the anticipated liability to the vehicle insurance company over the period of the insurance. The risk is used to set the premium for the policy. Setting the premium balances the liability of the policy with the attractiveness of the policy. The vehicle insurance company, over the aggregate of all of its vehicle insurance companies, seeks to collect enough in premiums to cover the anticipated claims. Setting premiums too high would result in increased reserves, but may drive away current and potential customers. Setting premiums too low may result in not having enough assets in reserve to cover claims. The vehicle insurance company preferable collects enough in premiums to cover anticipated claims, plus operating expenses and a reasonable profit margin.

Insurance premiums can be established based on personal, but generally static, data as well as physical information about the vehicle covered. This includes age, gender, marital status, driving record, parking location of the vehicle and miles driven. Driving record, over the span of many insurance renewals, typically represents the greatest variability in these factors. However, driving record does not take into account drivers who pose actual risks, and merely extrapolates from a poor driving record to determine risk. This leads to inequity in insurance premiums, in some examples. For instance, a driver with a poor driving record (accidents, moving violations and the like) may, in fact, be a very good driver who has poor luck. This driver may only drive a few miles an hour over the speed limit, but always seems to be cited for it. They may have been in accidents that were entirely not their fault, but which appear on their record. This driver may in fact be a very good driver and should have premiums that reflect that. Contrast that with the aggressive driver who never is cited, and always avoids accidents. This driver may drive many miles an hour over the speed limit, makes erratic lane changes, tailgates, does drag race starts at every traffic light or stop sign, brakes heavy, etc. This driver is actually a much higher risk than the previous driver. Though they have never had an issue with their record, the odds are that they will. When they are involved in an accident, it may actually be a much more severe accident than the former driver. This means higher liability to the vehicle insurance company. These drivers are the greatest variability for the vehicle insurance company. It appears that they are a low risk, so their premiums are low. However, the liability of an accident for them is so high, that claims for this driver drain down the reserve because their actual liability was never accounted for.

The data processing module 108, in concert with systems operating at the vehicle insurance company and described herein, resolve this conflict. By measuring actual vehicle performance, and by calculating actual driver behavior, the vehicle insurance company can properly set premiums because they have actually measured the real risk of the driver or the vehicle. This performance data may include, in some examples, performance data related to the driving of the vehicle. For example, speed data, g-load data, mileage data, average acceleration, average deceleration, and the like. Vehicle performance data may also include, in further examples, engine performance data, such as, oil temperature, fluid levels, cylinder temperature, spark plug voltage, fuel-air mixture, fuel flow, air pressure, boost pressure (if engine is turbocharged, or supercharged), emissions gas readings, and the like. Collectively, these may also be called engine performance data. Though impacted by the driving of the vehicle, aggressive driving, or risky driving, per se, would not be immediately apparent by looking at these data sources without regard to others. Engine performance data may be characterized as that data that is collected by the vehicle itself during normal monitoring of its own performance. Performance data with respect to driver behavior could be collected by bolt on, or after market, installed units, such as the data processing module. It could also be directly read from engine monitoring systems installed by the manufacturer of the vehicle.

Figure 2:
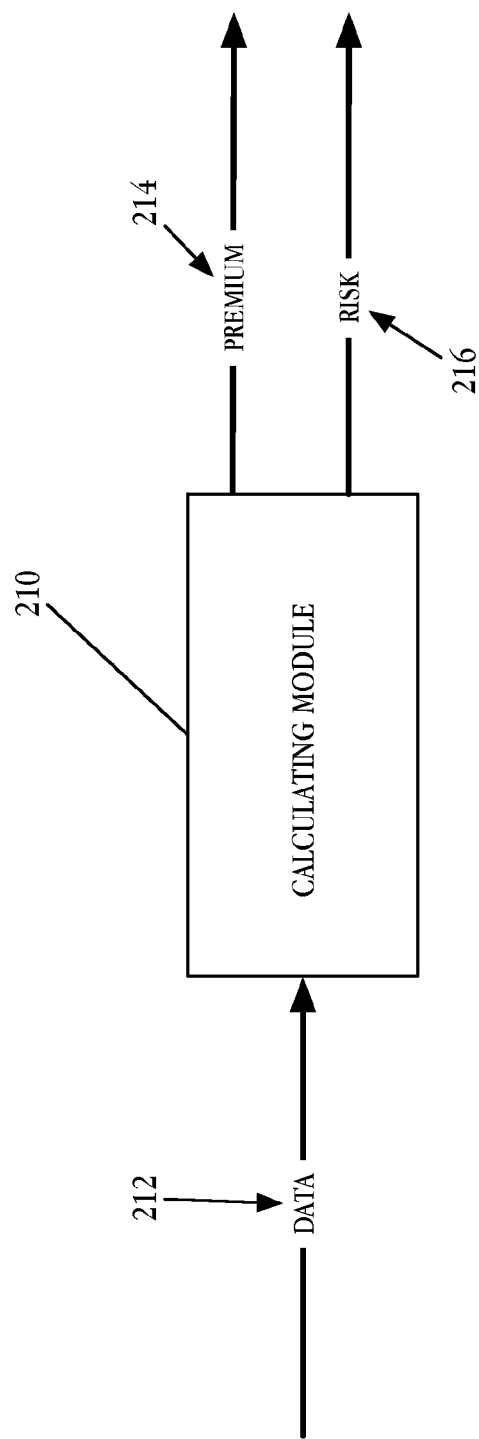
FIG. 2 shows a high-level block diagram block diagram of an apparatus for processing vehicle data, in accordance with an example embodiment.

FIG. 2 shows a high-level block diagram block diagram of an apparatus for processing vehicle data, in accordance with an example embodiment. In an embodiment, a calculating module 210 receives data 212 from data processing modules 108 installed in vehicles and outputs a premium 214. Alternately, the calculating module 210 may output a risk 216, which may be used by other downstream systems in conjunction with personal data and physical vehicle information, as discussed above.

In an embodiment, the calculating module 210 is operated by the vehicle insurance company 104 and is configured to process data received from a vehicle insured by the vehicle insurance company. The data may include vehicle performance data, vehicle behavior data, driver behavior data, or some combination. Using the data, the calculating module generates, or calculates a premium, a risk, or both. The premium includes an insurance premium, which the insured pays to the vehicle insurance company in return for compensation, or coverage, if the vehicle is involved in an accident, or experiences some loss. The risk is a measure of the risk associated with underwriting an insurance policy for the vehicle. The risk may be used by other systems to set an insurance premium. It may also be used in some examples, to determine whether to continue coverage.

Figure 3:
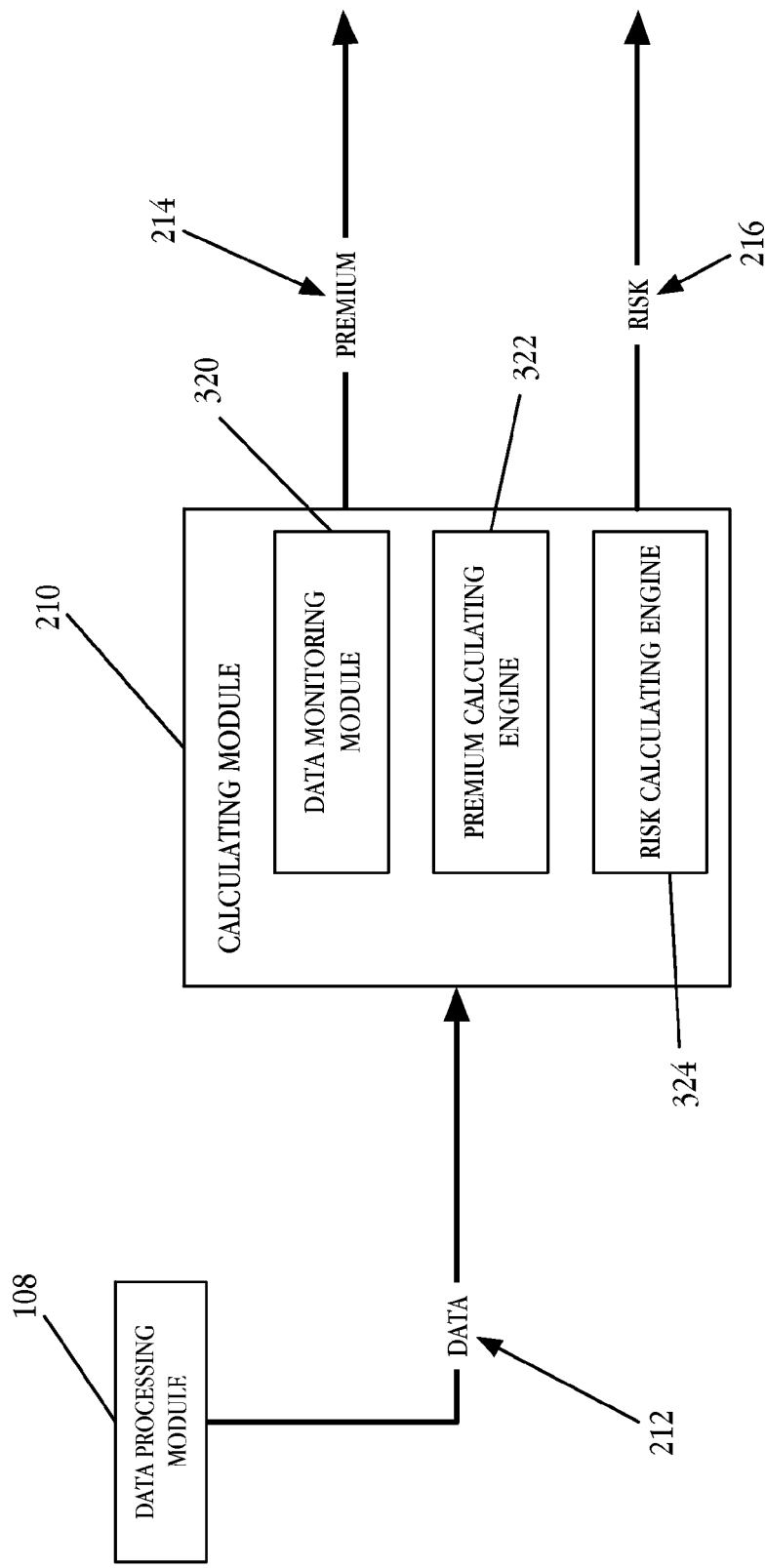
FIG. 3 shows a more detailed block diagram of an apparatus for processing vehicle data, in accordance with an example embodiment.

FIG. 3 shows a more detailed block diagram of an apparatus for processing vehicle data, in accordance with an example embodiment. In an embodiment, the calculating module 210 includes a data monitoring module 320 coupled to either a premium calculating engine 322 or a risk calculating engine 324. As discussed above, the calculating module 210 may output either a premium 214 or a risk 216, or some combination of both. In an alternate embodiment, the data monitoring module 320 is coupled to both the premium calculating engine 322 and the risk calculating engine 324.

In an embodiment, the data monitoring module 320 is configured to receive data from the data processing module 108. As discussed above, the data may include vehicle performance data, vehicle behavior data, driver behavior data, or some combination. The data processing module 108 may include a self contained apparatus installed in the insured vehicle, in some examples. The installation may include sending, from the vehicle insurance company, the data processing module 108 to the insured, who then physically installs it in the insured vehicle. It may also include, in an alternate example, enabling a software module on a vehicle safety system. The vehicle safety system may include, without limitation a navigation system (either manufacture installed or third party installed), or a driver support system. One example of the driver support system is General Motor's OnStar® system. Any of these systems communicate to a central facility and provide navigational capabilities, driver assistance, emergency response, or some combination. The vehicle safety system acquires positional data through any suitable sensors in the vehicle. In this example, the data processing module acquires the positional data from the vehicle safety system and uses that positional data as vehicle performance data, which can be provided to the data monitoring module 320 as needed.

In an embodiment, the premium calculating engine 322 is configured to derive a premium for a vehicle insurance policy using the data received by the data monitoring module 320. The premium, as discussed above, is a measure of the risk of underwriting the vehicle insurance policy. Using the data received by the data monitoring module 320, the premium calculating module may derive a premium that more closely matches the risk. For instance, the data collected may show that drivers of the vehicle exhibit aggressive driving behaviors, which can lead to large insurance claims. Though no moving violations or accidents have occurred yet, the vehicle in this example is a large potential liability.

In an embodiment, the risk calculating engine 324 is configured to derive a risk associated with the vehicle insurance policy using the data. In one example, the at least one insurance risk is derived using just the behavior data without regard to any other information. The at least one insurance risk may include a probability that the operator of the vehicle corresponds with one or more driver categories, the one or more driver categories including at least one of the following: vehicle collector, diligent youth driver, defensive driver, and aggressive driver.

The vehicle collector is the operator who collects vehicles for display but not for operation. Their annual mileage is very low. A vehicle collector policy could have very low premiums to reflect that. The diligent youth driver is a young driver, who is traditionally considered a very high risk due to their age. However, the diligent youth driver, in this example, is a careful driver, exhibiting driver behaviors that are less risky then their counterparts. Vehicle insurance companies have tried to model this using the young driver's grades, which may be a rough predictor. Using actual behavior data for that driver, the diligent youth driver may be shown empirically and quoted properly. The defensive driver is a driver who may be denied insurance due to a questionable driving record. This driver may have their premiums calculated using their actual behavior. They would agree to have a data processing module installed in their vehicle as a condition of insurance. As discussed below, their premiums could be modified dynamically as data is collected showing their driving behavior. The aggressive driver is a category that represents high risk to the vehicle insurance company. The driving behavior, possibly never identified in their driving record, can lead to very high insurance claims, and liability. An aggressive driver policy would not be issued, per se, but individual drivers could be compared to this type of driver, and their insurance policy quoted properly.

In an embodiment, the calculating module 320 additionally includes an underwriting engine (not shown in FIG. 3) configured to receive a request for a vehicle insurance policy from a customer and to issue the vehicle insurance policy using the premium and the risk. The underwriting engine may, in some examples, satisfy licensure requirements of at least one jurisdiction. In an alternate example, the underwriting engine is configured to output a decision with regards to underwriting that is reviewed and approved by a licensed individual.

The calculating module additionally includes, in a further embodiment, a behavior processing module configured to derive behavior data from the vehicle performance data. The behavior processing module is coupled to the data monitoring module and the data monitoring module receives vehicle performance data from the data processing module installed on the vehicle. Through such an arrangement, the data may be processed without regard to the computational complexity, which might be the case with regards to the data processing module installed on the vehicle. Additionally, the behavior processing module coupled to the data monitoring module may be configured to respond to trends identified by processing data received from a plurality of data processing modules installed on a plurality of vehicles insured by the vehicle insurance company. In such an arrangement, the rules processed by the behavior processing module may be adapted quickly. However, to perform such modified operations within the data processing module installed in the vehicle would require an update to the rules processed. This may represent variations in premiums derived using that processed data across drivers who, in actual operations, operate their vehicles in a similar manner.

Figure 4B:
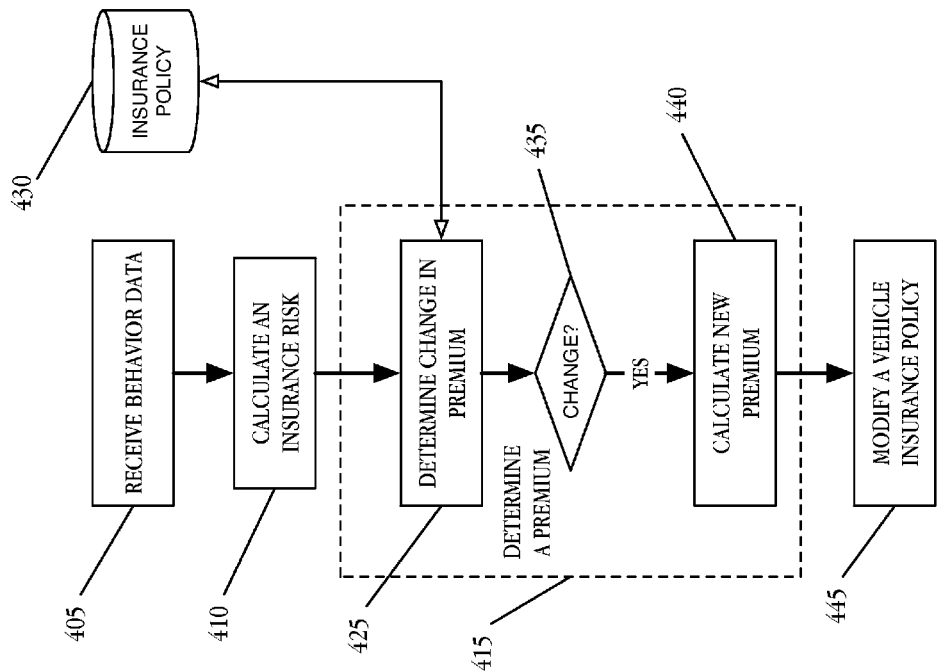
FIG. 4B shows a flowchart of an alternate method of issuing a vehicle insurance policy, in accordance with an example embodiment.
Figure 4A:
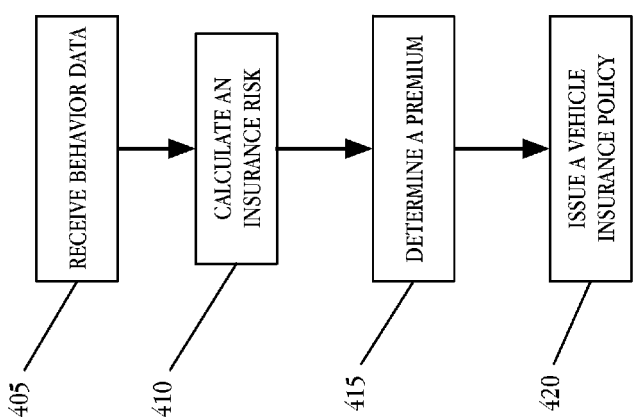
FIG. 4A shows a flowchart of a method for issuing a vehicle insurance policy, in accordance with an example embodiment.

FIG. 4A shows a flowchart of a method for issuing a vehicle insurance policy, in accordance with an example embodiment. An apparatus such as the calculating module 210 shown and described above, in one example can carry out the operations depicted in FIG. 4A.

At block 405, the apparatus receives behavior data. The behavior data may be received from a data processing module installed in an insured vehicle. The data processing module, in one example, obtains vehicle performance data from one or more sensors in the vehicle and derives behavior data that may be provided to the apparatus. In one example, the behavior data may be sent from the data processing module to the apparatus without request, such as during a periodic data upload. In an alternate example, the data monitoring module described above requests the data from the data processing module. In either example, the behavior data is used at block 410 to calculate an insurance risk. The insurance risk is a quantitative measure of the probable liability associated with underwriting an insurance policy. As discussed above, this may be derived using static information, but may be more accurate given the behavior data received at block 405.

At block 415, a premium is determined using the risk calculated at block 410. The premium may be intended to cover the potential liability of the policy over the term of the policy, with some additional percentage to provide for operating expenses and profits for the vehicle insurance company. The premiums collected, in the aggregate over many insurance policies, are intended to cover all the anticipated claims during the term of the policy. If fewer claims occur, the vehicle insurance company may have larger profits, but may also drive away potential customers if the premiums remain high. The more claims occur, the vehicle insurance company may draw down on reserves to cover those claims. Depending on whether a trend in claims is identified over a long term, the vehicle insurance company may choose to increase or decrease all premiums, or may choose to identify the segment of the insured customers that is experiencing the higher losses and increase premiums for just that customer segment. The vehicle insurance policy is issued at block 420. The operations shown in FIG. 4A may be repeated periodically as the insurance policy renews. The behavior data received at block 405 may, in a further example, be received during the period of a current term of insurance, with that behavior data being used to calculate risk for the next term.

FIG. 4B shows a flowchart of an alternate method of issuing a vehicle insurance policy, in accordance with an example embodiment. The operations depicted in FIG. 4B are a further embodiment of those described above with respect to FIG. 4B. The operation at block 415 may be further explained in FIG. 4B.

In one embodiment, the operations shown in FIG. 4B may be used when an insurance policy is due for renewal. For a customer with an insurance company that has no desire to switch companies or policies, their policy will typically renew without their initiation. Depending on what has happened during the last term with respect to the static information as described above (such as moving violations, and the like), their premium may go up or down. But, the insured customer does not need to call the vehicle insurance company and ask to have their policy renewed, it just happens. In this arrangement, using the systems previously described, the data received over that period may be used to modify the vehicle insurance policy.

At block 425, the present insurance risk is calculated using the behavior data received at block 405. This insurance risk may be different in some regard from the risk previously calculated, and which is stored, in an example, in an insurance policy data store 427. The present insurance and the previously calculated in insurance risk are used at block 430 to determine the present premium, If a change is identified at block 435, the new premium is calculated at block 440. This new premium may differ from the present premium determined at block 430 due to other factors, such as customer loyalty. Further, if the present premium is lower than the past premium, the vehicle insurance company may choose to keep the premium at its previous level. In this arrangement, the risk for the insured vehicle is less, so the vehicle insurance company may realize a greater profit from the policy. At block 445, the vehicle insurance policy is modified using the new premium calculated at block 440.

FIG. 5 shows a flowchart of a method for modifying an insurance premium, in accordance with an example embodiment. An apparatus such as the calculating module 210 shown and described above, in one example may carry out the operations shown in FIG. 5.

At block 505, performance data is received. The performance data may be vehicle performance data as described above, and may include, without limitation, vehicle mileage, vehicle location and traveled routes. Using the performance data, the premium is modified at block 510. In one example, the premium may be modified dynamically. Dynamically may include changing the premium immediately, or it may include only changing the premium after the insured has been informed. The performance data may be differentiated between each of the drivers that operate the vehicle, in one example. For instance, the premiums associated with the vehicle insurance policy may be driver-dependent. If so, the overall risk may be a combination of the risk of the individual drivers and the percentage of operation performed by those individual drivers. The data processing module, in this example, can further be configured to record the driver associated with the performance data.

Dynamic modification of an insurance premium for a vehicle may provide, in one or more examples, a pay as you drive system. For example, as a certain mileage for the vehicle is recorded, the premium associated with that mileage could be charged to the customer. In an alternate example, the mileage data may be used to determine the anticipated mileage over the term of the policy and if there is a large enough difference between what the policy is for, or on file, and the anticipated mileage, the premium may be changed accordingly to account for this additional risk. Likewise, the actual location of the vehicle may be used as a comparison to the filed location for the vehicle, and if there is enough of a change in premiums between the locations, the policy may be modified.

One aspect of risk for a vehicle insurance policy is the route that is traveled regularly by the insured vehicle. This route includes both distance traveled, but also includes which streets and highways are used. The risks associated with each of the different routes may be used to modify the premium. For instance, if the insured vehicle typically travels a route that has a high accident rate, and those accidents have large claims, the risk associated with traveling that route is high. And in covering that higher risk, the vehicle insurance policy should have a premium that may be higher. However, this route data is very dynamic. It would be advantageous to average traveled routes over time to determine the routes. However, the premium may be modified anytime the vehicle may be traveling a route that is considered high risk. One example of the use of such a system is vehicles traveling to foreign countries. The insured has the peace of mind knowing that if they ever need to travel to a foreign country with their vehicle, they do not need to inform the vehicle insurance company. They can just travel there, and while they are in the foreign country, their premiums are modified to take that into account. Using this system, the customer always knows they are covered no matter where they go, whenever they go there.

In a further embodiment, the performance data may be averaged over a period of time. The period of time may be the entirety of the vehicle insurance policy. It may also include shorter periods of time, if the premium is dynamically modified during the term of the policy. The averaging provides for a reduction of the effect of aberrant behavior. This aberrant behavior may include vacation trips, routes taken to avoid temporary construction, and a single driver using the vehicle in a manner that may be markedly different from the other drivers insured (such as lending a vehicle to a relative).

FIG. 6 shows a flowchart of a method for dynamically modifying a vehicle insurance premium, in accordance with an example embodiment. An apparatus such as the calculating module 210 shown and described above, in one example can carry out the operations shown in FIG. 6.

At block 605, the apparatus receives vehicle data. This may include vehicle performance data, vehicle behavior data or some combination. In an example, a data processing module installed in an insured vehicle acquires vehicle performance data from one or more sensors. The data processing module may, in one example, calculate vehicle behavior data using the vehicle performance data, and in turn provide the vehicle behavior data to the apparatus at block 605. Alternately, the data processing module acquires the vehicle performance data from one or more sensors and provides the vehicle performance data to the apparatus without any operations to process that data. In this example, the calculating module 210 may be operated by the underwriter of the vehicle insurance policy and calculates behavior data using the vehicle performance data. The data processing module, in a further example, may calculate vehicle behavior data, and provide both the vehicle performance data used and the calculated vehicle behavior data. In the example shown in FIG. 6, no differentiation is made between drivers, and the data received is aggregated data across all of the drivers.

At block 610, a premium is derived using the data. The apparatus may first calculate a risk associated with the vehicle using the data and then derive the premium using that risk, in one example. In an alternate example, the apparatus performs operations directly on the data, without calculating a risk. A vehicle insurance policy is issued at block 615, the vehicle insurance policy having the derived premium.

At block 620, further data is received from the vehicle. In one example, as a condition of insurance, a customer seeking insurance for the vehicle agrees to have the data processing module acquire future vehicle performance data. The customer may receive a discount on the premium. At block 625 a modified premium is derived using the further data, in one example. The modified premium may be derived using a combination of the further data received at block 620 and the data received at block 605. The modified premium derived at block 625 and the premium derived at block 610 are compared to determine a change in the premium. If the change in the premium exceeds a threshold change at block 630, operations proceed to block 635. The amount of change required to exceed the threshold may be set by the vehicle insurance company and may differ depending on whether the premium increases or decreases.

At block 630 the modified premium is used to modify the vehicle insurance policy. The change in the vehicle insurance policy may be communicated to the insured. In one example, the insured may be contacted if the premium is increased inquiring if the insured wishes to continue their policy, as well as to gather anecdotal data regarding the factors that led to the change in the premium.

Figure 7:
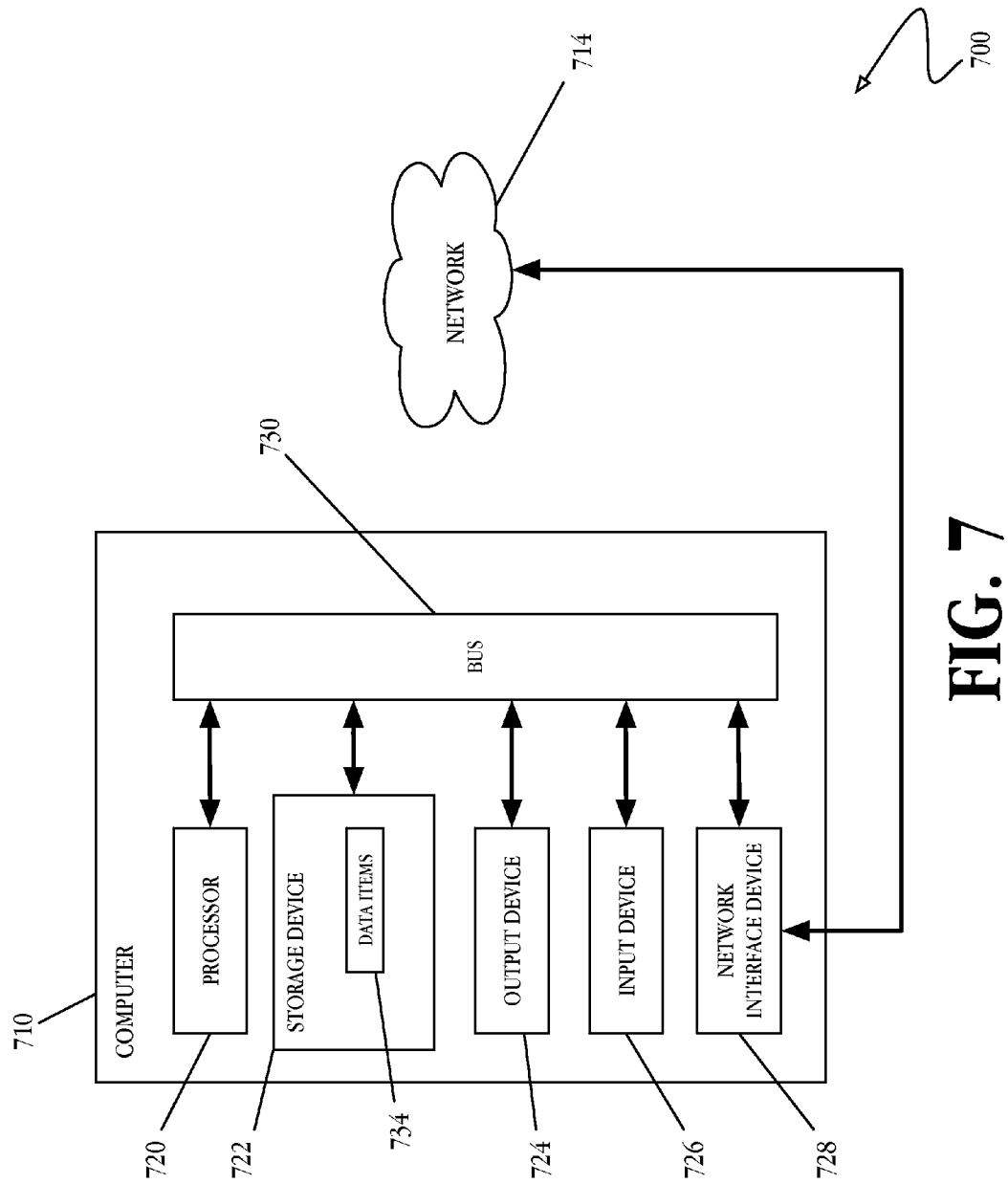
FIG. 7 shows a block diagram of a machine including instructions to perform any one or more of the methodologies described herein.

FIG. 7 shows a block diagram of a machine including instructions to perform any one or more of the methodologies described herein. A system 700 includes a computer 710 connected to a network 714. The computer 710 includes a processor 720, a storage device 722, an output device 724, an input device 726, and a network interface device 728, all connected via a bus 730. The processor 720 represents a central processing unit of any type of architecture, such as a CISC (Complex Instruction Set Computing), RISC (Reduced Instruction Set Computing), VLIW (Very Long Instruction Word), or a hybrid architecture, although any appropriate processor may be used. The processor 720 executes instructions and includes that portion of the computer 710 that controls the operation of the entire computer. Although not depicted in FIG. 7, the processor 720 typically includes a control unit that organizes data and program storage in memory and transfers data and other information between the various parts of the computer 710. The processor 720 receives input data from the input device 726 and the network 714 reads and stores code and data in the storage device 722 and presents data to the output device 724.

Although the computer 710 is shown to contain only a single processor 720 and a single bus 730, the disclosed embodiment applies equally to computers that may have multiple processors and to computers that may have multiple busses with some or all performing different functions in different ways.

The storage device 722 represents one or more mechanisms for storing data. For example, the storage device 722 may include read-only memory (ROM), random access memory (RAM), magnetic disk storage media, optical storage media, flash memory devices, and/or other machine-readable media. In other embodiments, any appropriate type of storage device may be used. Although only one storage device 722 is shown, multiple storage devices and multiple types of storage devices may be present. Further, although the computer 710 is drawn to contain the storage device 722, it may be distributed across other computers, for example on a server.

The storage device 722 includes a controller (not shown in FIG. 7) and data items 734. The controller includes instructions capable of being executed on the processor 720 to carry out the functions, as previously described above with reference to FIGS. 1-6. In another embodiment, some or all of the functions are carried out via hardware in lieu of a processor-based system. In one embodiment, the controller is a web browser, but in other embodiments the controller may be a database system, a file system, an electronic mail system, a media manager, an image manager, or may include any other functions capable of accessing data items. Of course, the storage device 722 may also contain additional software and data (not shown), which is not necessary to understand the invention.

Although the controller and the data items 734 are shown to be within the storage device 722 in the computer 710, some or all of them may be distributed across other systems, for example on a server and accessed via the network 714.

The output device 724 is that part of the computer 710 that displays output to the user. The output device 724 may be a liquid crystal display (LCD) well-known in the art of computer hardware. But, in other embodiments the output device 724 may be replaced with a gas or plasma-based flat-panel display or a traditional cathode-ray tube (CRT) display. In still other embodiments, any appropriate display device may be used. Although only one output device 724 is shown, in other embodiments any number of output devices of different types, or of the same type, may be present. In an embodiment, the output device 724 displays a user interface.

The input device 726 may be a keyboard, mouse or other pointing device, trackball, touchpad, touch screen, keypad, microphone, voice recognition device, or any other appropriate mechanism for the user to input data to the computer 710 and manipulate the user interface previously discussed. Although only one input device 726 is shown, in another embodiment any number and type of input devices may be present.

The network interface device 728 provides connectivity from the computer 710 to the network 714 through any suitable communications protocol. The network interface device 728 sends and receives data items from the network 714.

The bus 730 may represent one or more busses, e.g., USB (Universal Serial Bus), PCI, ISA (Industry Standard Architecture), X-Bus, EISA (Extended Industry Standard Architecture), or any other appropriate bus and/or bridge (also called a bus controller).

The computer 710 may be implemented using any suitable hardware and/or software, such as a personal computer or other electronic computing device. Portable computers, laptop or notebook computers, PDAs (Personal Digital Assistants), pocket computers, appliances, telephones, and mainframe computers are examples of other possible configurations of the computer 710. For example, other peripheral devices such as audio adapters or chip programming devices, such as EPROM (Erasable Programmable Read-Only Memory) programming devices may be used in addition to, or in place of, the hardware already depicted.

The network 714 may be any suitable network and may support any appropriate protocol suitable for communication to the computer 710. In an embodiment, the network 714 may support wireless communications. In another embodiment, the network 714 may support hard-wired communications, such as a telephone line or cable. In another embodiment, the network 714 may support the Ethernet IEEE (Institute of Electrical and Electronics Engineers) 802.3x specification. In another embodiment, the network 714 may be the Internet and may support IP (Internet Protocol). In another embodiment, the network 714 may be a local area network (LAN) or a wide area network (WAN). In another embodiment, the network 714 may be a hotspot service provider network. In another embodiment, the network 714 may be an intranet. In another embodiment, the network 714 may be a GPRS (General Packet Radio Service) network. In another embodiment, the network 714 may be any appropriate cellular data network or cell-based radio network technology. In another embodiment, the network 714 may be an IEEE 802.11 wireless network. In still another embodiment, the network 714 may be any suitable network or combination of networks. Although one network 714 is shown, in other embodiments any number of networks (of the same or different types) may be present.

Though the systems described herein have been described with respect to systems operated by the vehicle insurance company, they are not limited in such a manner. It may be advantageous for the systems to be operated by the vehicle insurance company, but may also be operated by a third party company which provides the information obtained from the systems to the vehicle insurance company.

The embodiments described herein may be implemented in an operating environment comprising software installed on any programmable device, in hardware, or in a combination of software and hardware.

Although embodiments have been described with reference to specific example embodiments, it will be evident that various modifications and changes may be made to these embodiments without departing from the broader spirit and scope of the invention. Accordingly, the specification and drawings are to be regarded in an illustrative rather than a restrictive sense.

What is claimed is:

1. A method of processing data received from a vehicle covered by a vehicle insurance policy, the method comprising:
    receiving, by a computing device having a computer processor and computer-readable code stored on a computer-readable medium and executable by the computer processor, behavior data from a data processing module installed in the vehicle, wherein the behavior data is a measure of driving behavior of one or more drivers operating the vehicle and is derived by the data processing module from vehicle performance data for the vehicle acquired by the data processing module;
    calculating, by the computing device, at least one insurance risk for the vehicle using the behavior data; and
    determining, by the computing device, a premium for the vehicle insurance policy for the vehicle using the at least one insurance risk;
    issuing, by the computing device, the vehicle insurance policy for the vehicle, the issued vehicle insurance policy having the premium;
    receiving, by the computing device, further behavior data from the data processing module;
    calculating, by the computing device, at least one insurance risk for the vehicle using the further behavior data;
    determining, by the computing device, a modified premium for the vehicle insurance policy for the vehicle using the at least one insurance risk calculated using the further behavior data;
    determining, by the computing device, if a threshold change between the premium and the modified premium is exceeded; and
    modifying, by the computing device, only if it is determined the threshold change is exceeded, the issued vehicle insurance policy to have the modified premium.

2. The method of claim 1, wherein the behavior data is behavior data associated with a single driver.

3. The method of claim 2, wherein the vehicle insurance policy is issued for the single driver.

4. The method of claim 1, wherein the behavior data is aggregated over all of the one or more drivers operating the vehicle.

5. The method of claim 4, wherein the vehicle insurance policy is issued for the vehicle.

6. The method of claim 1, wherein the at least one insurance risk is calculated using only the behavior data.

7. The method of claim 1, wherein the at least one insurance risk includes a probability that the operator of the vehicle corresponds with one or more driver categories, the one or more driver categories including at least one of the following: vehicle collector, diligent youth driver, defensive driver, and aggressive driver.

8. A machine-readable medium for processing data received from a vehicle covered by a vehicle insurance policy, which when executed by a machine, cause the machine to perform the following operations:
    receiving behavior data from a data processing module installed in the vehicle, wherein the behavior data is a measure of driving behavior of one or more drivers operating the vehicle and is derived by the data processing module from vehicle performance data for the vehicle acquired by the data processing module;
    calculating at least one insurance risk for the vehicle using the behavior data; and
    determining a premium for the vehicle insurance policy for the vehicle using the at least one insurance risk;
    issuing the vehicle insurance policy for the vehicle, the issued vehicle insurance policy having the premium;
    receiving further behavior data from the data processing module;
    calculating at least one insurance risk for the vehicle using the further behavior data;
    determining a modified premium for the vehicle insurance policy for the vehicle using the at least one insurance risk calculated using the further behavior data;
    determining if a threshold change between the premium and the modified premium is exceeded; and
    modifying, only if it is determined the threshold change is exceeded, the issued vehicle insurance policy to have the modified premium.

9. The machine-readable medium of claim 8, wherein the behavior data is behavior data associated with a single driver.

10. The machine-readable medium of claim 9, wherein the vehicle insurance policy is issued for the single driver.

11. The machine-readable medium of claim 8, wherein the behavior data is aggregated over all of the one or more drivers operating the vehicle.

12. The machine-readable medium of claim 11, wherein the vehicle insurance policy is issued for the vehicle.

13. The machine-readable medium of claim 8, wherein the at least one insurance risk is calculated using only the behavior data.

14. The machine-readable medium of claim 8, wherein the at least one insurance risk includes a probability that the operator of the vehicle corresponds with one or more driver categories, the one or more driver categories including at least one of the following: vehicle collector, diligent youth driver, defensive driver, and aggressive driver.

15. A device for processing data received from a vehicle covered by a vehicle insurance policy, the device comprising:
    a memory; and
    a processor coupled to the memory, wherein the processor is configured to:
        receive behavior data from a data processing module installed in the vehicle, wherein the behavior data is a measure of driving behavior of one or more drivers operating the vehicle and is derived by the data processing module from vehicle performance data for the vehicle acquired by the data processing module;

calculate at least one insurance risk for the vehicle using the behavior data;
determine a premium for a vehicle insurance policy for the vehicle using the at least one insurance risk;
issue the vehicle insurance policy for the vehicle, the issued vehicle insurance policy having the premium;
receive further behavior data from the data processing module;
calculate at least one insurance risk for the vehicle using the further behavior data;
determine a modified premium for the vehicle insurance policy for the vehicle using the at least one insurance risk calculated using the further behavior data;
determine if a threshold change between the premium and the modified premium is exceeded; and
modify, only if it is determined the threshold change is exceeded, the issued vehicle insurance policy to have the modified premium.

16. The device of claim 15, wherein the behavior data is behavior data associated with a single driver.

17. The device of claim 16, wherein the vehicle insurance policy is issued for the single driver.

18. The device of claim 15, wherein the behavior data is aggregated over all of the one or more drivers operating the vehicle.

19. The device of claim 18, wherein the vehicle insurance policy is issued for the vehicle.

20. The device of claim 15, wherein the at least one insurance risk is calculated using only the behavior data.

21. The device of claim 15, wherein the at least one insurance risk includes a probability that the operator of the vehicle corresponds with one or more driver categories, the one or more driver categories including at least one of the following: vehicle collector, diligent youth driver, defensive driver, and aggressive driver.

* * * * *